United States Patent
Namba

(10) Patent No.: US 9,021,422 B2
(45) Date of Patent: Apr. 28, 2015

(54) METHOD AND SYSTEM FOR PROCESSING INSTRUCTION INFORMATION

(71) Applicant: International Business Machines Corporation, Armonk, NY (US)

(72) Inventor: Kunio Namba, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 13/649,304

(22) Filed: Oct. 11, 2012

(65) Prior Publication Data
US 2013/0132709 A1 May 23, 2013

(30) Foreign Application Priority Data
Nov. 22, 2011 (JP) .................. 2011-255577

(51) Int. Cl.
G06F 9/44 (2006.01)
G06F 9/30 (2006.01)

(52) U.S. Cl.
CPC .............. *G06F 9/3017* (2013.01); *G06F 8/315* (2013.01); *G06F 8/72* (2013.01)

(58) Field of Classification Search
None
See application file for complete search history.

(56) References Cited

U.S. PATENT DOCUMENTS

2007/0277021 A1* 11/2007 O'Connor et al. ............ 712/208

* cited by examiner

*Primary Examiner* — Chuck Kendall
(74) *Attorney, Agent, or Firm* — Schmeiser, Olsen & Watts, LLP; John Pivnichny

(57) ABSTRACT

A method and system for processing instruction information. Each instruction information character string of a sequence of instruction information character strings are sequentially extracted and processed. Each instruction information character string pertains to an associated target object wrapped in a target object storage unit by an associated operation target model. It is independently ascertained for each instruction information character string whether to generate a code line for each instruction information character string, by: determining whether a requirement is satisfied and generating the code line and storing the code line in a code buffer if the requirement has been determined to be satisfied and not generating the code line if the requirement has been determined to not be satisfied. The requirement relates to whether the instruction information character string being processed comprises a naming instruction or a generation instruction. The generated code lines stored in the code buffer are displayed.

20 Claims, 14 Drawing Sheets

FIG. 7

| Sequence Information | Instruction Information |
|---|---|
| 1 | (java.lang.String Class, Declaration, "Given character string") |
| 2 | (javax.swing.JFrame Class, Instance A of Constructor, java.lang.String Class) |
| 3 | (Instance X of javax.swing.JFrame Class, Naming, "fooFrame") |
| 4 | (java.lang.String Class, Declaration, "Another Given character string") |
| 5 | (Instance B of java.lang.String Class, Naming, "newTitle") |
| 6 | (Instance X of javax.swing.JFrame Class, setTitle Method, Instance B of java.lang.String Class) |
| 7 | (Instance X of javax.swing.JFrame Class, setTitle Method, Instance A of java.lang.String Class) |

FIG. 8

| Name | Operation Target Model |
|---|---|
| "fooFrame" | Instance X of javax.swing.JFrame Class |
| "newTitle" | Instance B of java.lang.String Class |

FIG. 9

| Instruction Information | Operation Target Model |
|---|---|
| (java.lang.String Class, Declaration, "Given character string") | Instance A of java.lang.String Class |
| (javax.swing.JFrame Class, Constructor, Instance A of java.lang.String Class) | Instance X of javax.swing.JFrame Class |
| (java.lang.String Class, Declaration, "Another Specified String Character") | Instance B of java.lang.String Class |

FIG. 10

| Sequence Information | Instruction Information |
|---|---|
| 1 | (java.lang.String Class, Declaration, "Given character string") |
| 2 | (Instance X of javax.swing.JFrame Class, Naming, "fooFrame") |
| 3 | (Instance B of java.lang.String Class, Naming, "newTitle") |
| 4 | (Instance X of javax.swing.JFrame Class, setTitle Method, Instance B of java.lang.String Class) |
| 5 | (Instance X of javax.swing.JFrame Class, setTitle Method, Instance A of java.lang.String Class) |

METHOD AND SYSTEM FOR PROCESSING INSTRUCTION INFORMATION

TECHNICAL FIELD

The present invention relates to a device and method for supporting the generation of a program. More specifically, the present invention relates to a device and method for supporting the generation of a program which reproduces an operation instruction for operating an object.

BACKGROUND

Systems are known which record an operation performed by a user as a macro, and automatically generate source code for a program (referred to henceforth as "program code") to reproduce the same operation.

In a system for automatically generating program code using a macro, all of the target objects are usually named mechanically. However, when all of the target objects are named mechanically, program code cannot be generated that reflects the intentions of the operator. First, by naming all of the target objects, program code cannot be generated which reflects an intention of the operator to differentiate objects of target operations by the value specified for the operation into important objects and objects that are simply named and reused. As a result, useless variables are declared, and declared resources are used needlessly. Also, values that can be expressed inline are declared as variables in different locations and impede understanding.

BRIEF SUMMARY

The present invention provides a method for processing instruction information through use of a processor of a computer system, said method comprising:

said processor sequentially extracting and processing each instruction information character string of a sequence of instruction information character strings stored in a target object storage unit, wherein each instruction information character string pertains to an associated target object wrapped in the target object storage unit by an associated operation target model, wherein said processing comprises ascertaining independently for each instruction information character string in the sequence whether to generate a code line for said each instruction information character string in the sequence, wherein said ascertaining independently for each instruction information character string comprises determining whether or not a requirement is satisfied and generating the code line and storing the code line in a code buffer if the requirement has been determined to be satisfied and not generating the code line if the requirement has been determined to not be satisfied, wherein the requirement relates to whether the instruction information character string being processed comprises a naming instruction or a generation instruction, wherein the naming instruction is for naming the target object associated with the instruction information character string being processed, wherein the generation instruction is for generating the operation target model associated with the target object associated with the instruction information character string being processed, wherein said ascertaining comprises determining that the requirement is satisfied for one or more instruction information character strings in the sequence, wherein said ascertaining comprises determining that the requirement is not satisfied for at least one instruction information character string in the sequence, after the instruction information character strings in the sequence have been processed, said processor displaying the generated code lines stored in the code buffer.

The present invention provides a computer program product, comprising a computer readable storage device having computer readable program code stored therein, said program code containing instructions configured to be executed by a processor of a computer system to implement a method for processing instruction information through use of a processor of a computer system, said method comprising:

said processor sequentially extracting and processing each instruction information character string of a sequence of instruction information character strings stored in a target object storage unit, wherein each instruction information character string pertains to an associated target object wrapped in the target object storage unit by an associated operation target model, wherein said processing comprises ascertaining independently for each instruction information character string in the sequence whether to generate a code line for said each instruction information character string in the sequence, wherein said ascertaining independently for each instruction information character string comprises determining whether or not a requirement is satisfied and generating the code line and storing the code line in a code buffer if the requirement has been determined to be satisfied and not generating the code line if the requirement has been determined to not be satisfied, wherein the requirement relates to whether the instruction information character string being processed comprises a naming instruction or a generation instruction, wherein the naming instruction is for naming the target object associated with the instruction information character string being processed, wherein the generation instruction is for generating the operation target model associated with the target object associated with the instruction information character string being processed, wherein said ascertaining comprises determining that the requirement is satisfied for one or more instruction information character strings in the sequence, wherein said ascertaining comprises determining that the requirement is not satisfied for at least one instruction information character string in the sequence, after the instruction information character strings in the sequence have been processed, said processor displaying the generated code lines stored in the code buffer.

The present invention provides a computer system comprising a processor, a memory coupled to the processor, and a computer readable storage device coupled to the processor, said storage device containing program code configured to be executed by the processor via the memory to implement a method for processing instruction information through use of a processor of a computer system, said method comprising:

said processor sequentially extracting and processing each instruction information character string of a sequence of instruction information character strings stored in a target object storage unit, wherein each instruction information character string pertains to an associated target object wrapped in the target object storage unit by an associated operation target model, wherein said processing comprises ascertaining independently for each instruction information character string in the sequence whether to generate a code line for said each instruction information character string in the sequence, wherein said ascertaining independently for each instruction information character string comprises determining whether or not a requirement is satisfied and generating the code line and storing the code line in a code buffer if the requirement has been determined to be satisfied and not generating the code line if the requirement has been determined to not be satisfied, wherein the requirement relates to whether the instruction information character string being processed comprises a naming instruction or a generation instruction, wherein the naming instruction is for naming the target object associated with the instruction information character string being processed, wherein the generation instruction is for generating the operation target model associated with the target object associated with the instruction information character string being processed, wherein said ascertaining comprises determining that the requirement is satisfied for one or more instruction information character strings in the sequence, wherein said ascertaining comprises determining that the requirement is not satisfied for at least one instruction information character string in the sequence, after the instruction information character strings in the sequence have been processed, said processor displaying the generated code lines stored in the code buffer.

BRIEF DESCRIPTION OF THE DRAWINGS

FIG. 7 is a diagram showing an example of registered content in an instruction execution sequence table inside the program generating device in the embodiment of the present invention.

FIG. 8 is a diagram showing an example of registered content in a name-model mapping table inside the program generating device in the embodiment of the present invention.

FIG. 9 is a diagram showing an example of registered content in an instruction information-model mapping table inside the program generating device in the embodiment of the present invention.

FIG. 10 is a diagram showing an example of registered content in an instruction execution sequence table that has been updated prior to a program code generating operation performed by the program generating device in the embodiment of the present invention.

DETAILED DESCRIPTION

Figure 1:
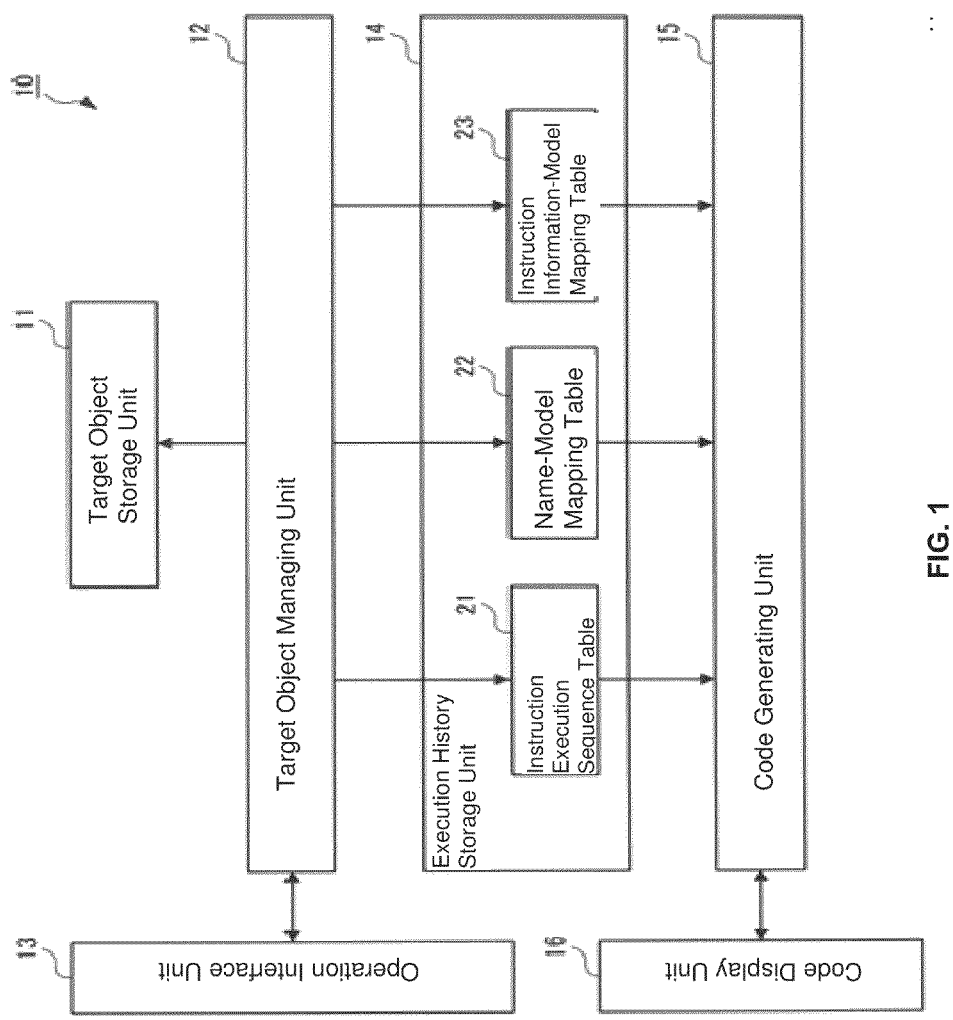
FIG. 1 is a block diagram showing a functional configuration example of a program generating device in an embodiment of the present invention.

The following is a detailed explanation of the embodiment of the present invention with reference to the appended drawings.

A purpose of the present invention is to generate program code in which objects to be described by a name for naming an object as a target of an operation have been differentiated from objects to be described by a value. Another purpose of the present invention is to generate program code in which objects to serve as a target of an operation are described by names specified by the user.

In order to achieve these purposes, the present invention is a device for supporting the generation of a program for reproducing an operation instruction for operating an object, wherein the device includes a receiving unit for receiving the operation instruction inputted by a user; an operation instruction information registering unit for registering operation instruction information indicating the operation instruction received by the receiving unit; a naming information registering unit for registering naming information associating a specified name with the object without attaching the name specified by a naming instruction to the object when the operation instruction received by the receiving unit is a naming instruction for naming the object; an acquiring unit for sequentially acquiring the operation instruction information registered by the operation instruction information registering unit in accordance with generation instructions in the code of the program; a generating unit for not generating the code when the operation instruction information acquired by the acquiring unit indicates a generation instruction for generating the object, for generating the code for declaring the object when the operation instruction information acquired by the acquiring unit indicates a naming instruction, for generating the code for operating the object using the name associated with the object in the naming information if naming information has not been registered by the instruction information registering unit when the operation instruction information acquired by the acquiring unit indicates neither a generation instruction nor a naming instruction but another operation instruction, and for generating the code for operating the object using the value of the object if naming information has not been registered by the naming information registering unit; and a display unit for displaying the code generated by the generating unit.

Here, the generating unit may generate the code for operating the object using the name associated with the argument object in the naming information if naming information has been registered in the argument object, the argument object being an argument for another operation instruction, from the naming information registering unit when the operation instruction information acquired by the acquiring unit indicates another operation instruction, and may generate the code for operating the object using the value of the argument object if the naming information has not been registered in the argument object, the argument object being an argument for another operation instruction, from the naming information registering unit. Also, the generating unit may generate the code for declaring the object using the name associated with the argument object in the naming information if naming information has been registered for the argument object, the argument object being the argument for the constructor instruction, by the instruction information registering unit when the operation instruction information acquired from the acquiring unit indicates a naming instruction and the instruction for the generated object is a constructor instruction, and may generate the code for declaring the object using the value of the argument object if instruction information has been registered for the argument object, the argument object being an argument for a constructor instruction, by the naming information registering unit.

In addition, the generating unit may count the number of locations at which code was generated using the value of an object, and the display unit may also display information recommending the naming of the object when the number of locations counted by the generating unit is greater than a predetermined threshold value. Also, the generating unit may count the number of occurrences of a situation of an object having been referenced by a subsequent operation instruction without the object having been named when the operation instruction information acquired by the acquiring unit indicates a generation instruction, and the display unit may also display information recommending the naming of the object when the number of occurrences counted by the generating unit is greater than a predetermined threshold value. Also, the generating unit may count the number of occurrences of a situation of naming information not being registered by the naming information registering unit when the operation instruction information acquired by the acquiring unit indicates another operation instruction, and the display unit may also display information recommending the naming of the object when the number of occurrences counted by the generating unit is greater than a predetermined threshold value. In addition, the generating unit may count the number of occurrences of a situation of naming information not being registered for an argument object, the argument object being an argument of another operation instruction, by the naming information registering unit when the operation instruction information acquired by the acquiring unit indicates another operation instruction, and the display unit may also display information recommending the naming of the object when the number of occurrences counted by the generating unit is greater than a predetermined threshold value. Furthermore, the generating unit may count the number of occurrences of a situation of naming information not being registered for an argument object, the argument object being an argument of a constructor instruction, by the naming information registering unit when the operation instruction information acquired by the acquiring unit indicates a naming instruction and the instruction of the generated object is a constructor instruction, and the display unit may also display information recommending the naming of the object when the number of occurrences counted by the generating unit is greater than a predetermined threshold value.

The present invention also provides a device for supporting the generation of a program for reproducing an operation instruction for operating an object, wherein the device includes a receiving unit for receiving the operation instruction inputted by a user; an operation instruction information registering unit for registering operation instruction information indicating the operation instruction received by the receiving unit; a naming information registering unit for registering naming information associating a specified name with the object without attaching the name specified by a naming instruction to the object when the operation instruction received by the receiving unit is a naming instruction for naming the object; a generation information registering unit for registering generation information having generation instruction information indicating a generation instruction associated with the object when the operation instruction received by the receiving unit is a generation instruction for generating the object; an acquiring unit for sequentially acquiring the operation instruction information registered by the operation instruction information registering unit in accordance with generation instructions in the code of the program; a generating unit for not generating the code when the operation instruction information acquired by the acquiring unit indicates the generation instruction, for generating the code for declaring the object using the name of the object obtained on the basis of the operation instruction information when the operation instruction information acquired by the acquiring unit is the naming instruction and the instruction for the generated object is a declaration instruction, for generating the code for declaring the object using the name of the object obtained on the basis of the operation instruction information when the operation instruction information acquired by the acquiring unit is a naming instruction and the instruction for the generated object is a constructor instruction, for generating the code for declaring the object using the name associated with an argument object in the naming information if naming information for the argument object, the argument object being an argument for the constructor instruction from the naming information registering unit, has been registered, for generating the code for declaring the object using the value of the argument object obtained on the basis of the generation instruction information associated with the argument object in the generation information registered by the generation information registering unit if the naming information has not been registered in the argument object, the argument object being an argument for a constructor instruction, from the naming information registering unit, for generating the code for operating the object using the name associated with the object in the naming information if the naming information has not been registered by the naming information registering unit when the operation instruction information acquired by the acquiring unit is neither a generation instruction nor a naming instruction but another operation instruction, for generating the code for operating the object using the value of the object obtained on the basis of the generation instruction information associated with the object in the generation information registered by the generation information registering unit if instruction information has not been registered in the naming information registering unit, for generating the code for operating the object using the name associated with the argument object in the naming information if naming information has not been registered in the argument object, the argument object being an argument for another operation instruction, from the naming information registering unit, and for generating the code for operating the object using the value of the argument object obtained on the basis of the generation information associated with the argument object in the generation information registered in the generation information registering unit if naming information has not been registered for the argument object, the argument object being an argument for another operation instruction, from the naming information registering unit; and a display unit for displaying the code generated by the generating unit.

Here, the generating unit may execute a first count of the occurrences of a first situation, the first situation being a situation of an object being referenced by subsequent operation instructions without the object having been named when the operation instruction information acquired by the acquiring means indicates a generation instruction, and executes a second count of the occurrences of a second situation, the second situation being a situation of naming information not being registered by the naming information registering unit when operation instruction information acquired by the acquiring unit indicates another operation instruction, and the display unit may also display information recommending the naming of the object when the sum of the number of first occurrences and the number of second occurrences counted by the generating unit is greater than a predetermined threshold value. Also, the generating unit may execute a third count of the occurrences of a third situation, the third situation being naming information not being registered for an argument object, the argument object being an argument for another operation instruction, by the naming information registering unit when the operation instruction information acquired by the acquiring unit indicates another operation instruction, and executes a fourth count of the occurrences of a fourth situation, the fourth situation being a situation of naming information not being registered for an argument object, the argument object being a constructor instruction, from the naming information registering unit when the operation instruction information acquired by the acquiring unit is a naming instruction and the instruction for the generated object is a constructor instruction, and the display unit may also display information recommending the naming of the object when the sum of the number of third occurrences and the number of fourth occurrences counted by the generating unit is greater than a predetermined threshold value.

The present invention also provides a method for supporting the generation of a program for reproducing an operation instruction for operating an object, wherein the method includes a step for receiving the operation instruction inputted by a user; a step for registering operation instruction information indicating the received operation instruction; a step for registering naming information associating a specified name with the object without attaching the name specified by a naming instruction to the object when the received operation instruction is a naming instruction for naming the object; a step for sequentially acquiring the registered operation instruction information in accordance with generation instructions in the code of the program; a step for not generating the code when the operation instruction information acquired by the acquiring step indicates a generation instruction for generating the object, for generating the code for declaring the object when the acquired operation instruction information indicates a naming instruction, for generating the code for operating the object using the name associated with the object in the naming information if naming information has been registered when the acquired operation instruction information indicates neither a generation instruction nor a naming instruction but another operation instruction, and for generating the code for operating the object using the value of the object if naming information has not been registered; and a step for displaying the generated code.

Also, the present invention provides a program enabling a computer to function as a device for supporting the generation of a program for reproducing an operation instruction for operating an object, wherein the program enables the computer to function as a receiving unit for receiving the operation instruction inputted by a user; an operation instruction information registering unit for registering operation instruction information indicating the operation instruction received by the receiving unit; a naming information registering unit for registering naming information associating a specified name with the object without attaching the name specified by a naming instruction to the object when the operation instruction received by the receiving unit is a naming instruction for naming the object; an acquiring unit for sequentially acquiring the operation instruction information registered by the operation instruction information registering unit in accordance with generation instructions in the code of the program; a generating unit for not generating the code when the operation instruction information acquired by the acquiring unit indicates a generation instruction for generating the object, for generating the code for declaring the object when the operation instruction information acquired by the acquiring unit indicates a naming instruction, for generating the code for operating the object using the name associated with the object in the naming information if naming information has not been registered by the instruction information registering unit when the operation instruction information acquired by the acquiring unit indicates neither a generation instruction nor a naming instruction but another operation instruction, and for generating the code for operating the object using the value of the object if naming information has not been registered by the naming information registering unit; and a display unit for displaying the code generated by the generating unit.

The present invention is able to generate program code in which objects to be described by a name for naming an object as a target of an operation have been differentiated from objects to be described by a value.

FIG. 1 is a block diagram showing a functional configuration example of a program generating device 10 in an embodiment of the present invention. The program generating device 10 in FIG. 1 has a target object storage unit 11, a target object managing unit 12, an operation interface unit 13, an execution history storage unit 14, a code generating unit 15, and a code display unit 16.

The target object storage unit 11 stores objects of target operations (referred to henceforth as "target objects"). Here, the target objects can be any object that can be handled using Java®, such as character strings, numerical values, frames and files.

The target object managing unit 12 is realized using an operation target model introduced to represent the state of target objects while working. Here, the operation target model is a wrapper object for wrapping a target object stored in the target object storage unit 11.

First, because an operation target model is associated with a single target object, it has a field for reference information on the target object (for example, a target object ID which identifies the target object). The operation target model also has a name field in which a name is specified for the target object. Because the operation target model is associated with a target object, the name specified for the target object can be regarded as the name given also to the operation target model.

The operation target model also has a method in which functions are defined. First, a function is defined in the method for generating instruction information that represents the operation instruction. The instruction information removes instruction information representing naming instructions for the target object, and executes the operation instruction for the target object. When, for example, the operation instruction is an instruction for generating a target object, the instruction information includes the instruction content and reference information on the operation target model involved in the generation of the target object. Also defined in the method are a function for registering the instruction information in the instruction execution sequence table 21 (described below), a function for registering corresponding information between a name given to the operation target model and the operation target model in a name-model mapping table 22 (described below), and a function for registering correspondence information between instruction information and the operation target model generated by the instruction information in an instruction information-model mapping table 23 (described below). In this embodiment, instruction information is used as an example of operation instruction information indicating an operation instruction, correspondence information between a name and an operation target model to which this name has been attached is used as naming information associated with a name specifying an object, and correspondence information between instruction information and an operation target model generated by the operation instruction represented by the instruction information is used as the generation information associated with generation instruction information indicating a generation instruction for an object. The target object managing unit 12 is provided as an example of an operation instruction information recording unit for recording operation instruction information, a naming information registering unit for registering naming information, and a generation information registering unit for registering generation information.

In FIG. 1, a target object storage unit 11 and a target object managing unit 12 form a single pair. The number of pairs depends on the number of instances in a class.

The operation interface unit 13 displays on a display mechanism 90d (see FIG. 14) an operation target model corresponding to a target object, and a list of operation instructions defined in advance for the target object. An operation instruction selected from the list using the keyboard/mouse 90i is received. Here, the operation instructions include an instruction for naming the target object. Because the operation target model represents the state of the target object while working, the operation interface unit 13 attaches a provisional name to the target object while working and displays this. In other words, the operation target model is instructed to display the target object with a name attached. When the target object is character string "xxx", "xxx" is simply displayed if a name has not been attached to the target object. If the name "namex" has been attached to the target object, namex="xxx" is displayed. In this embodiment, the operation interface unit 13 is provided as an example of a receiving unit for receiving an operation instruction.

The execution history storage unit 14 stores an execution history each time an operation instruction is executed. The code generating unit 15 converts the execution history stored in the execution history storage unit 14 in the program code. In the present embodiment, the code generating unit 15 is provided as an example of an acquiring unit for sequentially acquiring operation instruction information, and a generating unit for generating code. The code display unit 16 outputs program code generated by the code generating unit 15 to the display mechanism 90d (see FIG. 14). In the present embodiment, the code display unit 16 is provided as an example of a display unit for displaying code.

The execution history storage unit 14 also stores the instruction execution sequence table 21, name-model mapping table 22 and the instruction information-model mapping table 23. The instruction execution sequence table 21 is tabular data storing the sequence in which instruction information, generated each time an operation instruction was executed, has been executed. The name-model mapping table 22 is tabular data storing corresponding information between names assigned to operation target models, and operation target models. The instruction information-model mapping table 23 is tabular data storing corresponding information between instruction information and operation target models generated by the instruction information.

Figure 14:
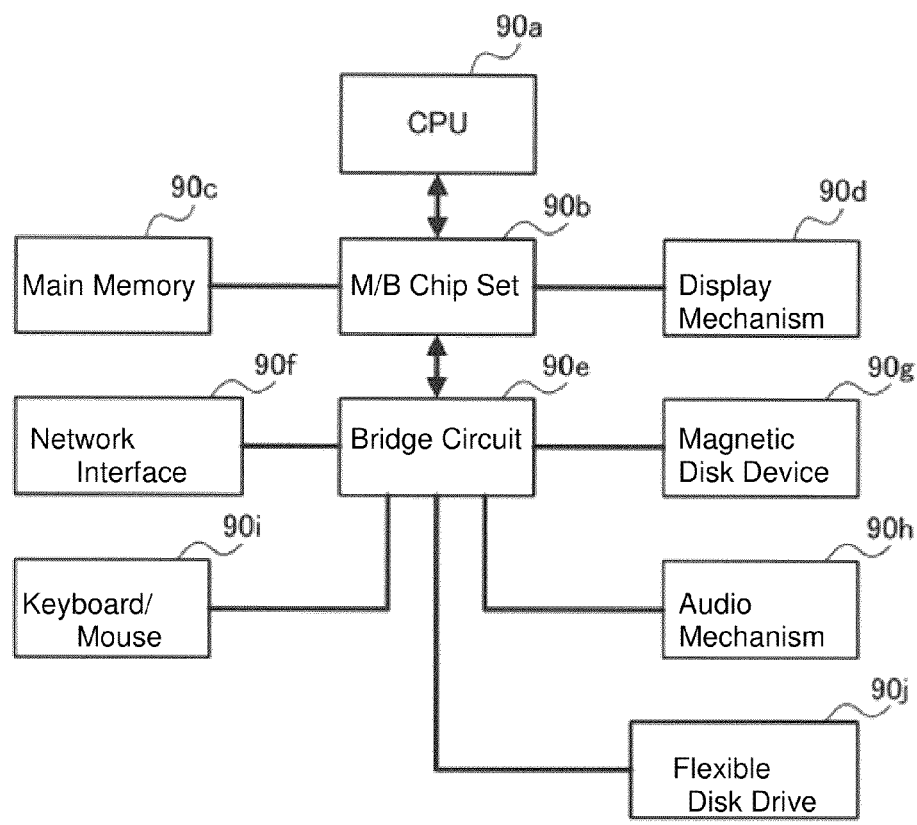
FIG. 14 is a diagram showing the hardware configuration of a computer able to apply the embodiment of the present invention.

Among these functions, the target object managing unit 12, the operation interface unit 13, the code generating unit 15 and the code display unit 16 are realized when the CPU 90a (see FIG. 14) reads programs and software stored in a magnetic disk device 90g (see FIG. 14) and executes them via the main memory 90c (see FIG. 14). The target object storage unit 11 and the execution history storage unit 14 are realized, for example, by the magnetic disk device 90g (see FIG. 14).

Figure 2:
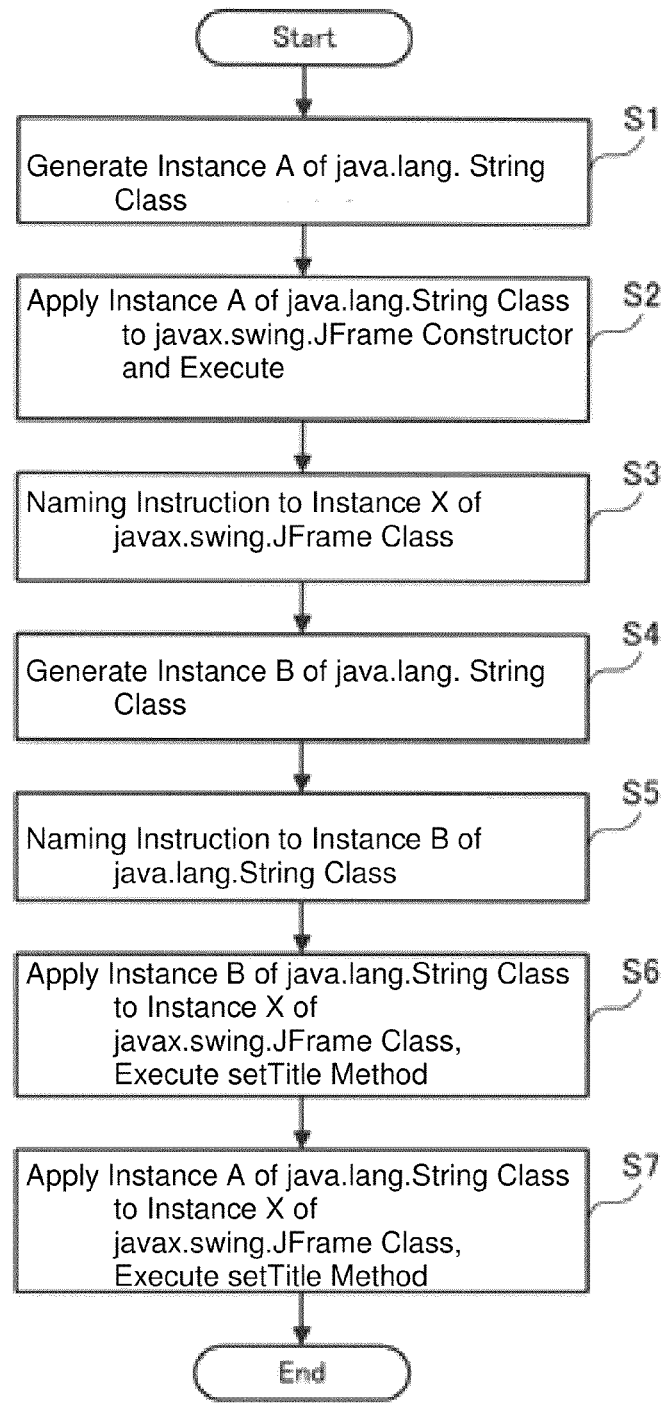
FIG. 2 is a flowchart showing an example of user operations used to explain a first schematic operation of the program generating device in the embodiment of the present invention.

FIG. 2 is a flowchart showing an example of a user operation used to explain a first schematic operation of the program generating device in the embodiment of the present invention. In reality, user operations are performed on the operation target model. However, except for situations in which a user operation is performed to name a target object, the target object managing unit 12 executes operation instructions on target objects in response to user operations. In this explanation, user operations are treated as operations performed directly on target objects.

First, the user generates character string "given character string" as instance A of the java.lang.String class (Step 1).

Next, the user applies instance A of the java.lang.String class generated in Step 1 to the constructor for the javax.swing.JFrame class, and generates instance X of the javax.swing.JFrame class (Step 2). Then, the name "fooFrame" is given to instance X of the javax.swing.JFrame class generated in Step 2 (Step 3).

Next, the user generates character string "another given character string" as instance B of the java.lang.String class (Step 4). Then, the name "newTitle" is given to instance B of the java.lang.String class generated in Step 4 (Step 5).

Afterwards, the user applies instance B of the java.lang.String class generated in Step 4 to instance X of the javax.swing.JFrame class generated in Step 2 and executes the setTitle method (Step 6). Also, instance A of the java.lang.String class generated in Step 1 is applied to instance X of the javax.swing.JFrame class generated in Step 2, and the setTitle method is executed (Step 7).

Figure 3:
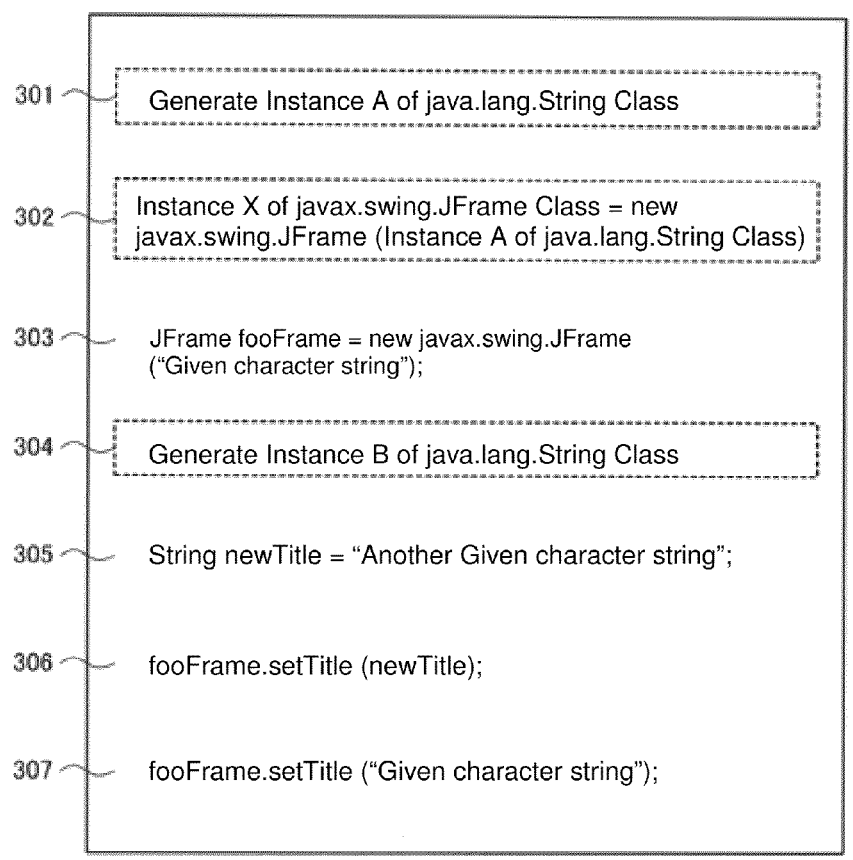
FIG. 3 is a flowchart showing an example of program code generated by the first schematic operation of the program generating device in the embodiment of the present invention.

FIG. 3 is a diagram used to explain the program code generated when the operation in each step is performed in response to user operations as shown in FIG. 2. In FIG. 2, the code is not actually expressed. In order to simplify the explanation, the code not expressed is enclosed in dotted lines. Code not expressed is code that is not added to the code buffer in step 132 and thus not displayed in step 135 of FIG. 11.

First, the code 301 is code generating instance A of the java.lang.String class. Because instance A of the java.lang.String class is generated but not named when the operation in Step 1 is performed, the code 301 is not expressed.

Code 302 and 303 is code for applying instance A of the java.lang.String class to the constructor of the javax.swing.JFrame class, and generating instance X of the javax.swing.JFrame class. Because instance X of the javax.swing.JFrame class is generated but not named when the operation in Step 2 is performed, code 302 is not expressed. Because instance X of the javax.swing.JFrame class is named when the operation in Step 3 is performed, code 303 is expressed. Because instance A of the java.lang.String class is not named, the "given character string" is expanded inline.

Code 304 and 305 are code for generating instance B of the java.lang.String class. Because instance B of the java.lang.String class is generated but not named when the operation in Step 4 is performed, code 304 is not expressed. Because instance B of the java.lang.String class is named when the operation in Step 5 is performed, code 305 is expressed.

Also, code 306 is code for applying instance B of the java.lang.String class to instance X of the javax.swing.JFrame class, and executing the setTitle method. Because instance X of the javax.swing.JFrame class and instance B of the java.lang.String class are both named when the operation in Step 6 is performed, code 306 is expressed so these instances are exported as variables. Code 307 is code for applying instance A of the java.lang.String class to instance X of the javax.swing.JFrame class, and executing the setTitle method. Because instance X of the javax.swing.JFrame class is named but instance A of the java.lang.String class is not named when the operation in Step 7 is performed, code 307 is exported in which only the former instance is exported as a variable. The "given character string" is developed inline in the latter instance.

Because instance A of the java.lang.String class is never named, it is always treated as a value. In other words, a region for storing this instance is reserved in the memory space each time the instance is expressed. When this region is no longer needed, it is discarded. Meanwhile, instance B of the java.lang.String class is the same character string as instance A of the java.lang.String class. However, because it is named, it becomes a target for access as a variable.

Figure 4:
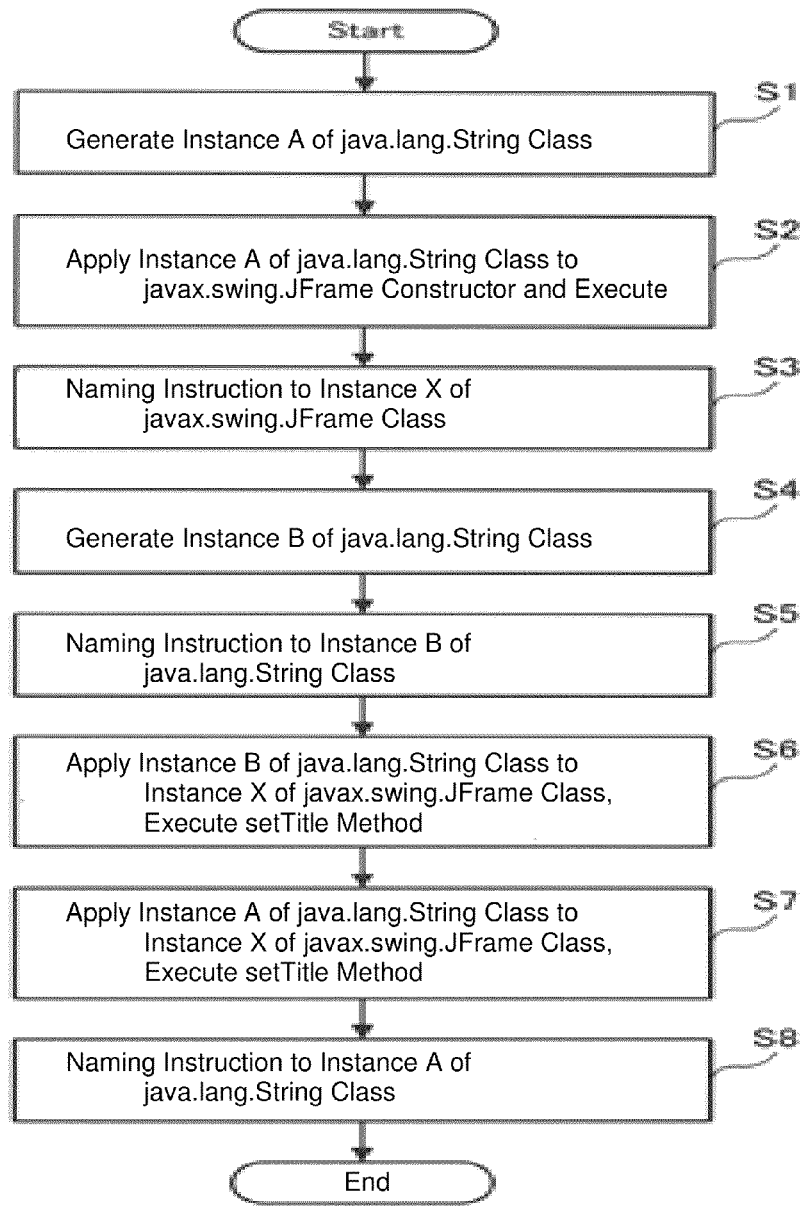
FIG. 4 is a flowchart showing an example of user operations used to explain a second schematic operation of the program generating device in the embodiment of the present invention.

FIG. 4 is a flowchart showing the flow of user operations used to explain a second schematic operation of the program generating device in the embodiment of the present invention. In reality, user operations are performed on the operation target model. However, except for situations in which a user operation is performed to name a target object, the target object managing unit 12 executes operation instructions on target objects in response to user operations. In this explanation, user operations are treated as operations performed directly on target objects. First, the user performs the operations shown in Step 1 through Step 7 of FIG. 2. Finally, the name "barTitle" is given to instance A of the java.lang.String class generated in Step 1 (Step 8).

Figure 5:
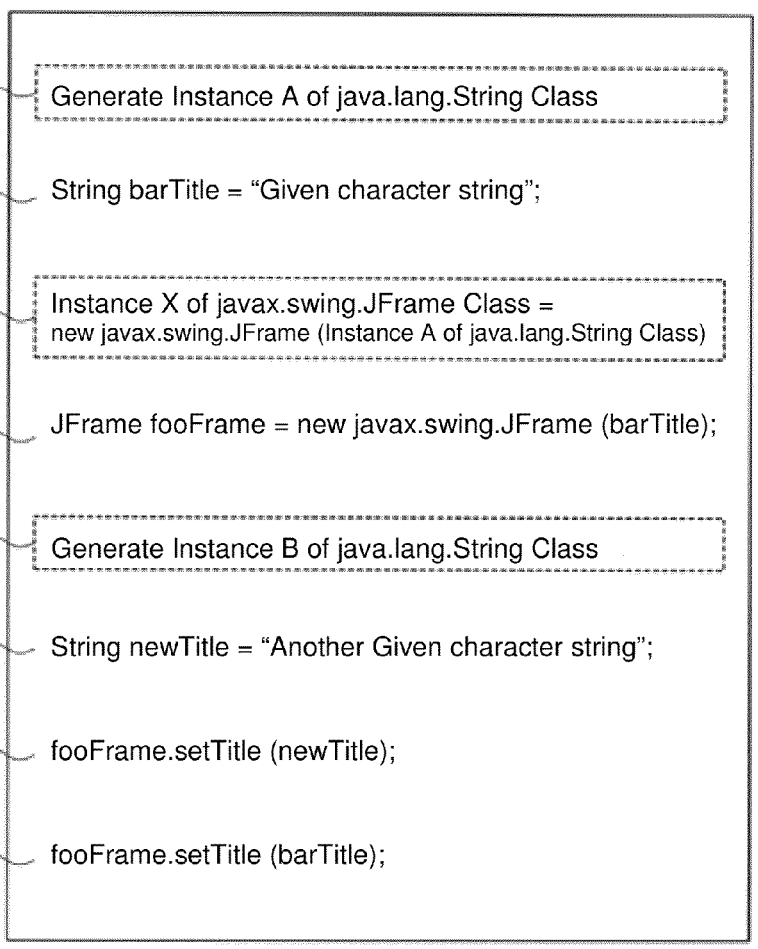
FIG. 5 is a flowchart showing an example of program code generated by the second schematic operation of the program generating device in the embodiment of the present invention.

FIG. 5 is a diagram used to explain the program code generated when the operation in each step is performed in response to a user operation as shown in FIG. 4. In this drawing, the code is not actually expressed. In order to simplify the explanation, it is enclosed in dotted lines.

First, codes 351 and 358 are codes generating instance A of the java.lang.String class. Because instance A of the java.lang.String class is generated but not named when the operation in Step 1 is performed, code 351 is not expressed. Meanwhile, code 358, which is a declaration at the generation point of this instance, is generated when instance A of the java.lang.String class is named "barTitle" in Step 8.

Also, codes 352 and 353 are codes for applying instance A of the java.lang.String class to the constructor of the javax.swing.JFrame class, and generating instance X of the javax.swing.JFrame class. Because instance X of the javax.swing.JFrame class is generated but not named when the operation in Step 2 is performed, code 352 is not expressed. Meanwhile, because instance X of the javax.swing.JFrame class is named when the operation in Step 3 is performed, code 353 is expressed. Here, because instance A of the java.lang.String class had not been named when the operation in Step 3 is performed, it is expanded inline as shown in FIG. 3. When named "barTitle" in Step 8, it is exported as a variable.

Code 354 and 355 are codes for generating instance B of the java.lang.String class. Because instance B of the java.lang.String class is generated but not named when the operation in Step 4 is performed, code 354 is not expressed. Because instance B of the java.lang.String class is named when the operation in Step 5 is performed, code 355 is expressed.

Also, code 356 is a code for applying instance B of the java.lang.String class to instance X of the javax.swing.JFrame class, and executing the setTitle method. Because both instance X of the javax.swing.JFrame class and instance B of the java.lang.String class are named when the operation in Step 6 is performed, code 356 is expressed in which these instances are exported as variables. Code 357 is a code for applying instance A of the java.lang.String class to instance X of the javax.swing.JFrame class, and executing the setTitle method. Because instance X of the javax.swing.JFrame class is named but instance A of the java.lang.String class is not named when the operation in Step 7 is performed, only the former instance is exported as a variable. The latter instance is expanded inline as shown in FIG. 3. However, when the latter instance is named "barTitle" in Step 8, it is exported as a variable.

Thus, the names reflect the entire program code and can be treated as variables even when instance A of the java.lang.String class is named later.

Generally speaking, the program generating device 10 performs two types of actions. First, it performs actions in accordance with the operations performed by the operation interface unit 13 on the target object. Because the naming operation for the target object is performed if necessary during this operation, the actions are also performed in accordance with the naming operation. Second, it performs actions to generate new program code and display this code on the display screen. These two types of actions will be explained in this order.

When the operation interface unit 13 sends an operation instruction to the target object managing unit 12 in accordance with a user operation, the target object managing unit 12 performs actions on the basis of the operation instruction. Here, the operation instructions include a naming instruction for the target object in addition to operation instructions such as execute function, acquire field value, and extract array element.

Figure 6:
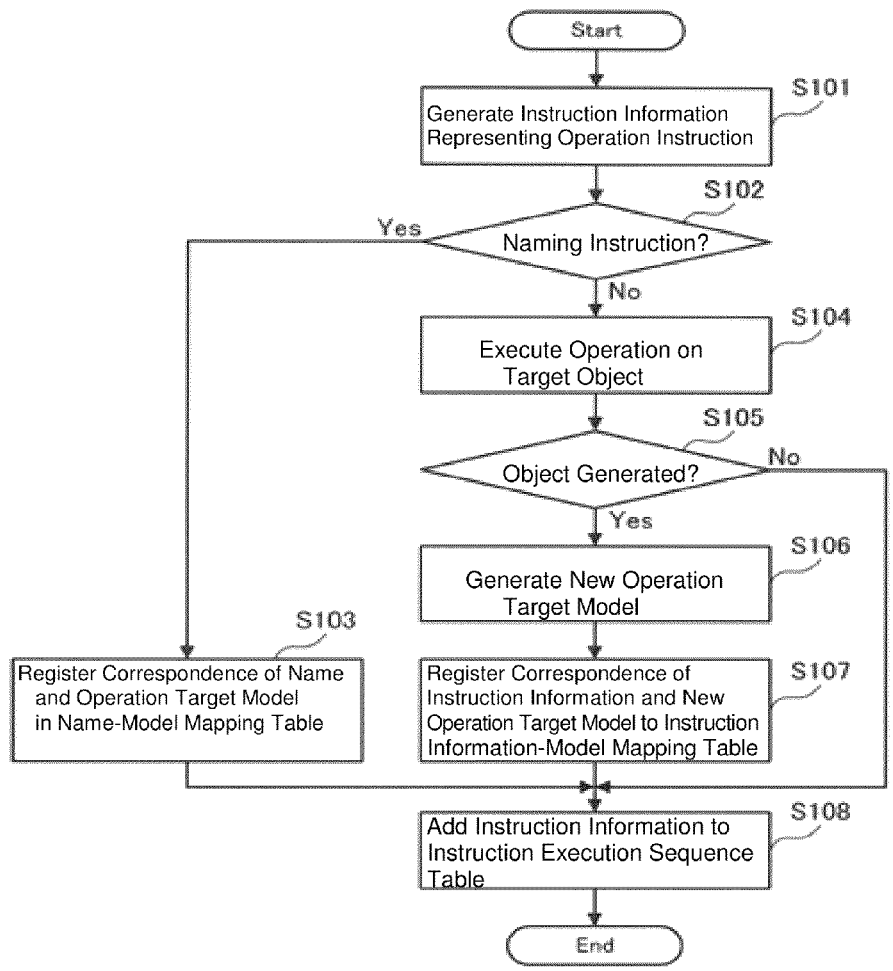
FIG. 6 is a flowchart showing an example of actions performed during a target object operation by the program generating device in the embodiment of the present invention.

FIG. 6 is a flowchart showing an example of actions performed by the target object managing unit 12 at this time. As shown in FIG. 6, the target object managing unit 12 first generates instruction information representing the operation instruction sent from the operation interface unit 13 (Step 101). Next, the target object managing unit 12 determines whether or not the operation instruction sent from the operation interface unit 13 is a naming instruction for the target object (Step 102).

If, as a result, it has been determined that the sent operation instruction is a naming instruction for a target object, the target object managing unit 12 does nothing to the target object, but corresponding information between the name that has been named and the operation target model for the target object is registered in the name-model mapping table 22 (Step 103). Next, the instruction information generated in Step 101 is added to the instruction execution sequence table 21 (Step 108).

If it has been determined that the sent operation instruction is not a naming instruction for a target object, the target object managing unit 12 executes an operation on the target object using the instruction information generated in Step 101 (Step 104). As a result of executing this operation, it is determined whether or not a new object has been generated (Step 105). Generation instructions for generating a new object include declaration instructions and contractor instructions.

Here, if it has been determined that a new object has been generated, the target object managing unit 12 generates a new operation target model, which is a wrapper object for wrapping the new object, and the new target object is referenced in the new operation target model (Step 106). The creation of a new operation target model by instruction information generated in Step 101 is registered in the instruction information-model mapping table 23 (Step 107). Next, the instruction information generated in Step 101 is added to the instruction execution sequence table 21 (Step 108).

If it has been determined that a new object has not been generated, the target object managing unit 12 does not generate a new operation target model or register information in the instruction information-model mapping table 23, but the instruction information generated in Step 101 is added to the instruction execution sequence table 21 (Step 108).

The following is an explanation of the content of the information registered by this operation in the instruction execution sequence table 21, the name-model mapping table 22, and the instruction information-model mapping table 23. The example in this explanation is the user operations performed in FIG. 2.

FIG. 7 is a diagram showing an example of registered content in the instruction execution sequence table 21 when actions have been performed in response to user operations as shown in FIG. 2. As shown in FIG. 7, the correspondence between order (i.e., sequence) information and instruction information is stored in the instruction execution sequence table 21. Here, order information is information indicating the spot in the order in which the operation instruction represented by the corresponding instruction information is executed. The instruction information is information representing the operation instruction indicated by the user, which is expressed in a certain format (operation target model, instruction, argument). Here, the operation target model indicates the target object that is the target of management.

Because character string "given character string" is generated as instance A of the java.lang.String class in Step 1 on the basis of user operations as shown in FIG. 2, the correspondence between order information "1" and the instruction information (java.lang.String class, declaration, "given character string") is registered.

Next, in Step 2, instance A of the java.lang.String class is applied to the constructor of the javax.swing.JFrame class, and instance X of the javax.swing.JFrame class is generated. Therefore, the correspondence between order information "2" and the instruction information (javax.swing.JFrame class, constructor, instance A of java.lang.String class) is registered. Next, in Step 3, the name "fooFrame" is given to instance X of the javax.swing.JFrame class. Therefore, the correspondence between order information "3" and the instruction information (instance X of the javax.swing.JFrame class, name, "fooFrame") is registered.

Next, in Step 4, character string "another given character string" is generated as instance B of the java.lang.String class. Therefore, the correspondence between order information "4" and the instruction information (java.lang.String class, declaration, "another given character string") is registered. In Step 5, the name "newTitle" is given to instance B of the java.lang.String class. Therefore, the correspondence between order information "5" and the instruction information (instance B of the java.lang.String class, name, "newTitle") is registered.

Afterwards, in Step 6, instance B of the java.lang.String class is applied to instance X of the javax.swing.JFrame class, and the setTitle method is executed. Therefore, the correspondence between order information "6" and the instruction information (instance X of the javax.swing.JFrame class, the setTitle method, and instance B of the java.lang.String class) is registered. In Step 7, instance A of the java.lang.String class is applied to instance X of the javax.swing.JFrame class, and the setTitle method is executed. Therefore, the correspondence between order information "7" and the instruction information (instance X of the javax.swing.JFrame class, the setTitle method, and instance A of the java.lang.String class) is registered.

FIG. 8 is a diagram showing an example of registered content in the name-model mapping table 22 when actions have been performed in response to user operations as shown in FIG. 2. As shown in FIG. 8, the correspondence between names and operation target models is registered in the name-model mapping table 22. Here, a name is a name given to the target object by a naming instruction. The operation target model is an operation target model for managing a named target object. Here, an operation target model indicates a target object that is a target for management.

In Step 3, the name "fooFrame" is given to instance X of the javax.swing.JFrame class by a user operation as shown in FIG. 2. Therefore, the correspondence of the name "fooFrame" and the operation target model "instance X of the javax.swing.JFrame class" is registered. In Step 5, the name "newTitle" is given to instance B of the java.lang.String class. Therefore, the correspondence of the name "newTitle" and the operation target model "instance B of the java.lang.String class" is registered.

FIG. 9 is a diagram showing an example of registered content in the instruction information-model mapping table 23 when actions have been performed in response to user operations as shown in FIG. 2. As shown in FIG. 9, the correspondence between naming information and operation target models is registered in the instruction information-model mapping table 23. Here, naming information is information representing operation instructions in which a target object is generated. Also, an operation target model is an operation target model for managing target objects generated by operation instructions representing naming information. Here, an operation target model indicates a target object that is a target for management.

In Step 1, instance A of the java.lang.String class is generated by a user operation as shown in FIG. 2. Therefore, the correspondence of the naming instruction (java.lang.String class, declaration, "given character string") and the operation target model "instance A of the java.lang.String class" is registered. In Step 2, instance X of the javax.swing.JFrame class is generated. Therefore, the correspondence of the naming information (javax.swing.JFrame class, constructor, instance A of the java.lang.String class) and the operation target model "instance X of the javax.swing.JFrame class" is registered. In Step 4, instance B of the java.lang.String class is generated. Therefore, the correspondence of naming information (java.lang.String class, declaration, "another given character string" and the operation target model "instance B of the java.lang.String class" is registered.

When the operations shown in FIG. 2 have been performed by the user and an instruction for the generation of program code has been issued, the code generating unit 15 performs actions to generate program code. The code generating unit 15 can also perform actions to generate program code on the basis of instructions from the computer. When the action has started, the code generating unit 15 first prepares a code buffer in which code has not been stored.

The code generating unit 15 searches the instruction information-model mapping table 23 for instructions that have generated an operation target model that is registered in the name-model mapping table 22. It deletes instructions that have generated this operation target model in the instruction execution sequence table 21, and moves the instruction that has named the operation target model to this position.

FIG. 10 is a diagram showing an example of registered content in the instruction execution sequence table 21 at this time. First, when the name-model mapping table 22 in FIG. 8 is referenced, the operation target models registered in the table are "instance X of the javax.swing.JFrame class" and "instance B of the java.lang.String class". Next, when the naming information-model mapping table 23 in FIG. 9 is referenced, the instruction information that has generated these is, respectively, (javax.swing.JFrame class, constructor, instance A of the java.lang.String class) and (java.lang.String class, declaration, "another given character string"). Therefore, in the instruction execution sequence table 21 in FIG. 7, the record of order information "2" is deleted, and the record of order information "3" is moved to this position. Also, the record in order information "4" is deleted, and the record in order information "5" is moved to this position. These changes generate the instruction execution sequence table 21 in FIG. 10. In this example, the deletion of instruction information generating the named operation target model does not generate code when the operation instruction information indicates a generation instruction for generating an object.

When these preparations have been completed, the code generating unit 15 moves to the actual process for generating program code.

Figure 11:
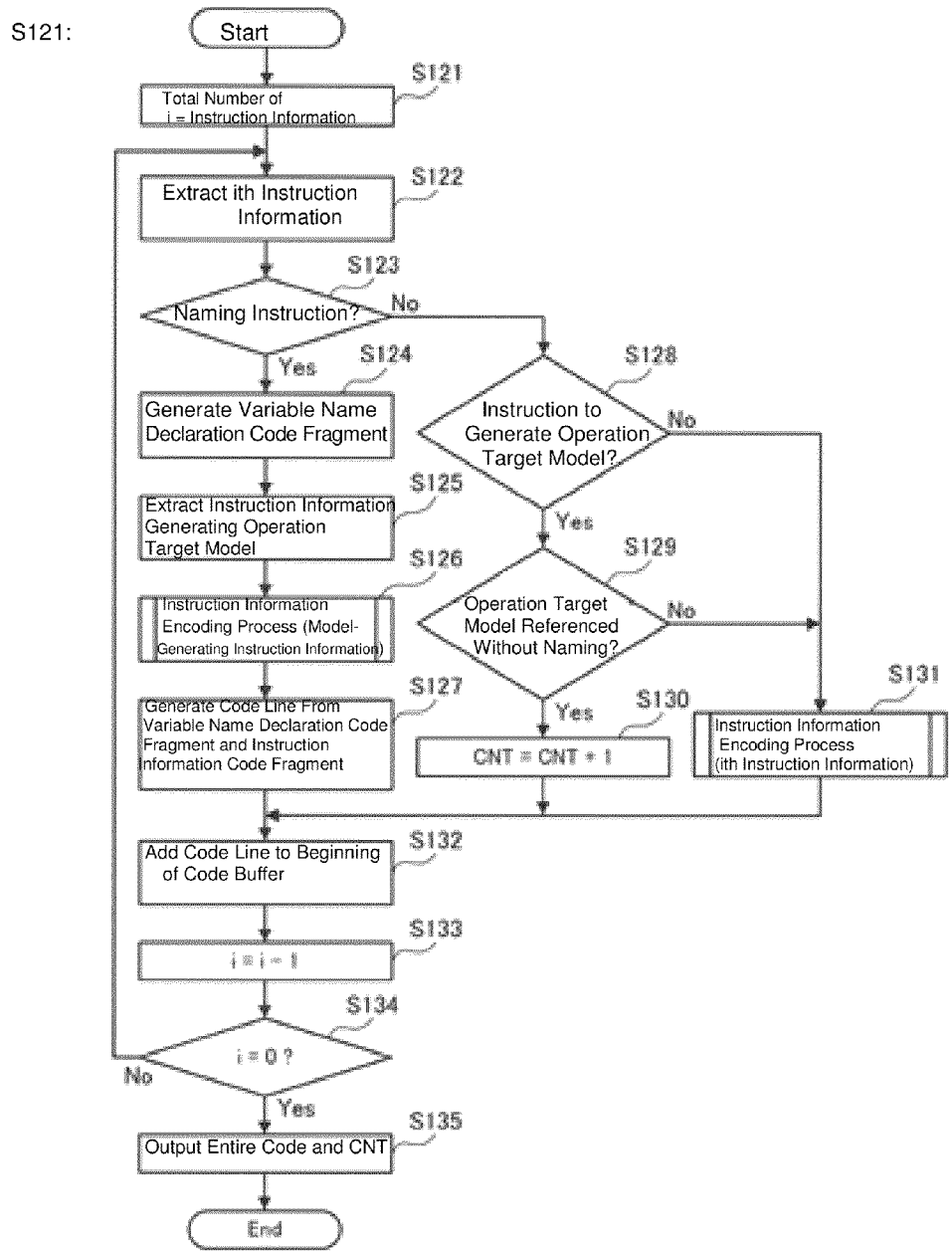
FIG. 11 is a flowchart showing an example of actions performed during the generation of program code by the program generating device in the embodiment of the present invention.

FIG. 11 is a flowchart showing an example of actions performed by the code generating unit 15 at this time. FIG. 11 depicts a method for processing the instruction information sequentially stored in table 21. As shown in FIG. 11, the code generating unit 15 first obtains the total number of instruction information from the instruction execution sequence table 21, and the total number of instruction information is substituted for variable i which counts the positions of instruction information during the processing (Step 121). Next, the code generating unit 15 repeats the process from Step 122 to Step 132, subtracting 1 from variable i until 0 is reached. The following is an explanation of the processing content of Step 122 through Step 132 regarding the variable i.

Initially, the code generating unit 15 extracts the instruction information in the ith position from the instruction execution sequence table 21. In other words, it extracts the instruction information corresponding to order information i (Step 122). It then determines whether instruction information representing an instruction naming an operation target model has been extracted (Step 123).

If, as a result, it has been determined that instruction information representing an instruction for naming an operation target model has been extracted, the code generating unit 15 first generates a variable name declaration code fragment (Step 124). Here, the variable name declaration code fragment is a code fragment for declaring a variable name. For example, when the variable "newTitle" is declared for the String class, the character string "StringnewTitle" is appropriate.

Next, the code generating unit 15 extracts from the instruction information-model mapping table 23 instruction information that has generated the operation target model in the instruction information (Step 125). Then, the code generating unit 15 calls up the instruction information encoding process, and obtains code fragments (Step 126). The instruction information encoding process is called up using as a parameter the instruction information (model generating instruction information) that generated the operation target model extracted in Step 125. This parameter is enclosed in parentheses in Step 126. The code fragments returned by the instruction information encoding process represent an instruction and value. In the example shown in FIG. 2, these are "newjavax.swing.J-Frame ('given character string')" and "another given character string". Henceforth, the code fragments returned by the instruction information encoding process are referred to as "instruction information code fragments", which means they are code fragments obtained by calling up the instruction information encoding process.

Next, the code generating unit 15 generates a code line, which is a line of program code, by linking the variable name declaration code fragment generated in Step 124 to the instruction information code fragment obtained in Step 126 using a substitution symbol (Step 127).

If it has been determined in Step 123 that instruction information representing an instruction for naming an operation target model has not been extracted, the code generating unit 15 determines whether instruction information representing an instruction for generating an operation target model has been extracted (Step 128).

If it has been determined that instruction information representing an instruction for generating an operation target model has been extracted, the code generating unit 15 determines whether or not subsequent instruction information with an unnamed operation target model (instruction information associated with greater order information in the instruction execution sequence table 21) has been referenced (whether or not there is an operation target model or argument in the instruction information) (Step 129). If it has been determined that there is an unnamed operation target model in a subsequent instruction, the code generating unit 15 adds "1" to the reference counter CNT indicating that a yet-to-be-named operation target model has been encoded (Step 130).

When it has been determined in Step 128 that instruction information representing an instruction for generating an operation target model has not been extracted, the code generating unit 15 calls up the instruction information encoding process to obtain an instruction information code fragment (Step 131).

When it has been determined in Step 128 that instruction information representing an instruction for generating an operation target model has been extracted and it has been determined in Step 129 that the operation target model has been named or not referenced in a subsequent instruction, the code generating unit 15 calls up the instruction information encoding process to obtain an instruction information code fragment (Step 131).

The instruction information encoding process in step 131 is called up using as a parameter the ith instruction information extracted in Step 122. This parameter is enclosed in parentheses in Step 131. Also, the instruction information code fragment returned by the instruction information encoding process represents an instruction. In the example shown in FIG. 2, this is "fooFrame.setTitle(newTitle)". In other words, the instruction information code fragment obtained here is a code line which is a line of program code.

Afterwards, the code generating unit 15 adds the code line obtained in Step 127 or Step 131 as the initial line of code in the code buffer (Step 132).

When Step 130 has been executed, a code line is not obtained so nothing is added to the code buffer in Step 132.

Because the code generating unit 15 repeats the process described above, subtracting 1 from variable i until 0 is reached, the code generating unit 15 counts down 1 from variable i which counts the position of the instruction information being processed (Step 133), and determines whether or not variable i has reached 0 in the countdown (Step 134). If as a result, variable i has not reached 0, the code generating unit 15 proceeds to Step 122. If variable i has reached 0, all of the code stored in the code buffer and the reference counter CNT value for each operation target model is outputted to the code display unit 16 (Step 135) for being displayed.

In this way, the code display unit 16 displays the code generated by the code generating unit 15 on the display mechanism 90d (see FIG. 14). At this time, information is also displayed which recommends the naming of the operation target model corresponding to the reference counter CNT which is greater than the predetermined threshold value (for example, "2"). The following is a detailed explanation of the instruction information encoding process called up in Step 126 and Step 131 of FIG. 11 or in Step 165 of FIG. 13 described below.

Thus, FIG. 11 depicts a method for processing instruction information through use of a processor 90a of a computer system of FIG. 14. The method comprises the processor sequentially extracting and processing each instruction information character string of a sequence of instruction information character strings stored in the target object storage unit 11. Each instruction information character string pertains to an associated target object wrapped in the target object storage unit by an associated operation target model. Said processing comprises ascertaining independently for each instruction information character string in the sequence whether to generate a code line for said each instruction information character string in the sequence. Said ascertaining, independently for each instruction information character string, comprises determining whether or not a requirement is satisfied and generating the code line and storing the code line in a code buffer if the requirement has been determined to be satisfied and not generating the code line if the requirement has been determined to not be satisfied. The requirement relates to whether the instruction information character string being processed comprises a naming instruction or a generation instruction. The naming instruction is for naming the target object associated with the instruction information character string being processed. The generation instruction is for generating the operation target model associated with the target object associated with the instruction information character string being processed. The ascertaining comprises determining that the requirement is satisfied for one or more instruction information character strings in the sequence. The ascertaining also comprises determining that the requirement is not satisfied for at least one instruction information character string in the sequence. After the instruction information character strings in the sequence have been processed, the generated code lines stored in the code buffer is displayed by the processor.

Figure 12:
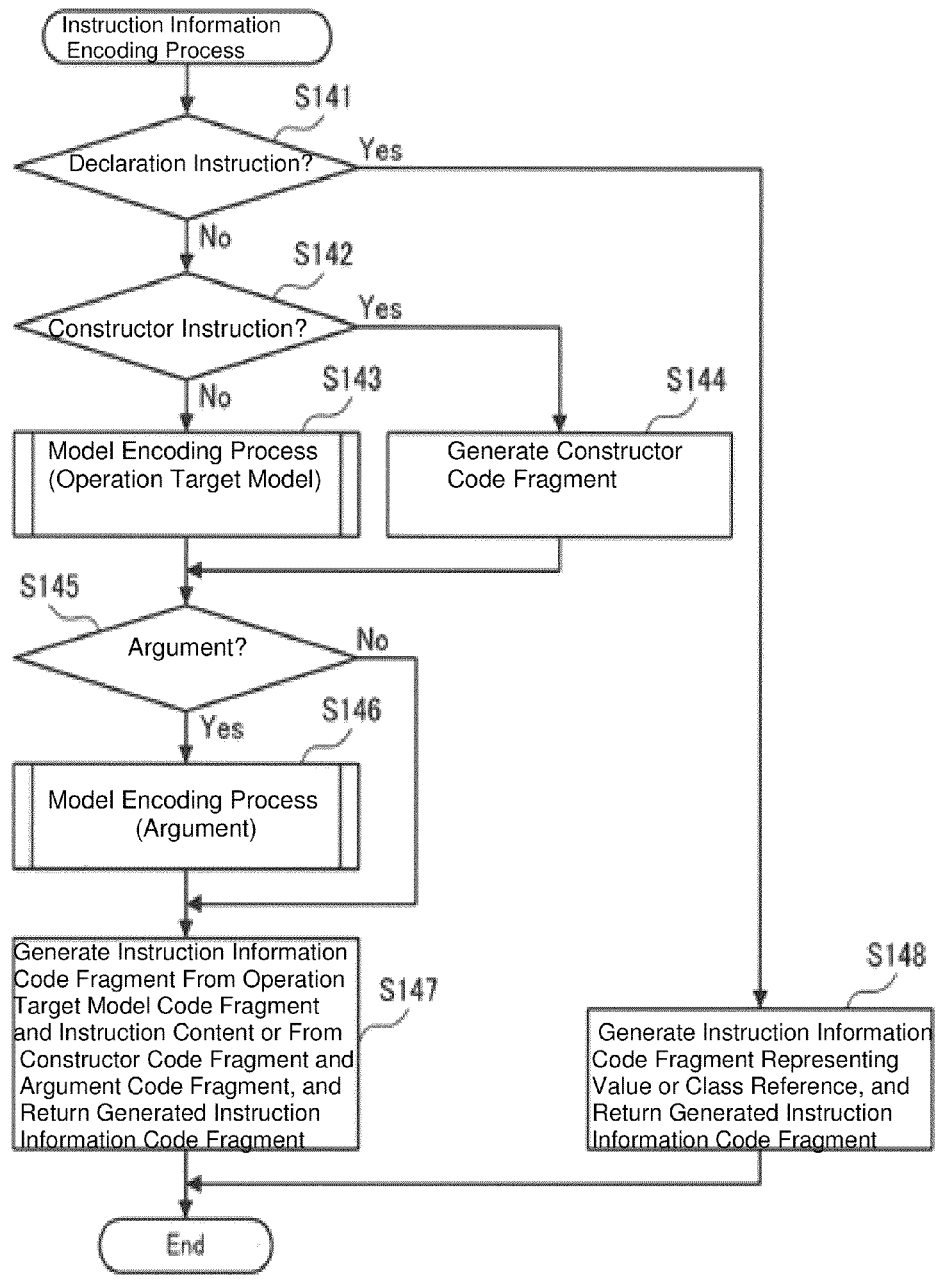
FIG. 12 is a flowchart showing the operational flow of the instruction information encoding process called up during the generation of program code by the program generating device in the embodiment of the present invention.

FIG. 12 is a flowchart showing the operational flow of the instruction information encoding process. As shown in FIG. 12, the code generating unit 15 determines whether or not the instruction code passed on during the call up is instruction information representing a declaration instruction (Step 141). Here, a declaration instruction is an instruction for declaring an operation target model. In the example shown in FIG. 2, this instruction is expressed by instruction information (java-.lang.String class, declaration, "given character string").

First, a situation is described in which it has been determined that the instruction information passed on during the call up is not instruction information representing a declaration instruction. Here, the code generating unit 15 determines whether the passed on instruction information is instruction information representing a constructor instruction (Step 142). Here, a constructor instruction is an instruction executed when a target object is generated. In the example shown in FIG. 2, this instruction is expressed by instruction information (javax.swing.JFrame class, constructor, instance A of the java.lang.String class).

If, as a result, it has been determined that the passed on instruction information is not instruction information representing a constructor instruction, the code generating unit 15 calls up the model encoding process (Step 143). The model encoding process is called up using the operation target model in the passed on instruction information as a parameter. This parameter is enclosed in parentheses in Step 143. The code fragment returned by the model encoding process represents a variable name or value. In the example shown in FIG. 2, it is "fooFrame", etc. Henceforth, the code fragment returned by the model encoding process is referred to as the "model code fragment", which means a code fragment obtained by calling up the model encoding process. However, because the code fragment returned here is a code fragment obtained by calling up the model encoding process using an operation target model as a parameter, it is referred to specifically as an "operation target model code fragment".

If, as a result, it has been determined that the passed on instruction information is instruction information representing a constructor instruction, the code generating unit 15 generates a code fragment that is a portion of the constructor (constructor code fragment) (Step 144). Here, for example, in FIG. 2, the constructor code fragment is "newjavax.swing.J-Frame("and")".

Afterwards, the code generating unit 15 determines whether there is an argument in the passed on instruction information (Step 145). Here, if it has been determined that there is no argument in the passed on instruction information, nothing is done. If it has been determined that there is an argument in the passed on instruction information, the code generating unit 15 calls up the model encoding process (Step 146). The model encoding process is called up using the argument as a parameter. This parameter is enclosed in parentheses in Step 146. The model code fragment returned from the model encoding process represents a variable name or value. In the example shown in FIG. 2, it is the "given character string", etc. However, because the code fragment returned here is a code fragment obtained by calling up the model encoding process using an argument as a parameter, it is referred to specifically as an "argument code fragment".

The code generating unit 15 generates an instruction information code fragment by combining an operation target model code fragment, instruction content, and an argument code fragment or by combining a constructor code fragment and an argument code fragment. This instruction information code is then returned (Step 147). For example, when the operation target model code fragment is "fooFrame", the argument code fragment is the "given character string" and the instruction content is "setTitle", the instruction information code fragment is "fooFrame.setTitle("given character string")". Step 147 is provided to be executed when it is determined that the passed on instruction information is instruction information representing a constructor instruction and when it has been determined that there is no argument in the passed on instruction information. However, a separate step can be provided for each of these situations.

The following is a description of the situation in which it has been determined that the instruction information passed on during call up is instruction information representing a declaration instruction. In this situation, the code generating unit 15 generates an instruction information code fragment representing a value or an instruction information code fragment representing a class reference (Step 148). Here, examples of instruction information code fragments representing values include the "given character string", "1", and "−1". An example of an instruction information code fragment representing a class reference is "java.lang.String".

Figure 13:
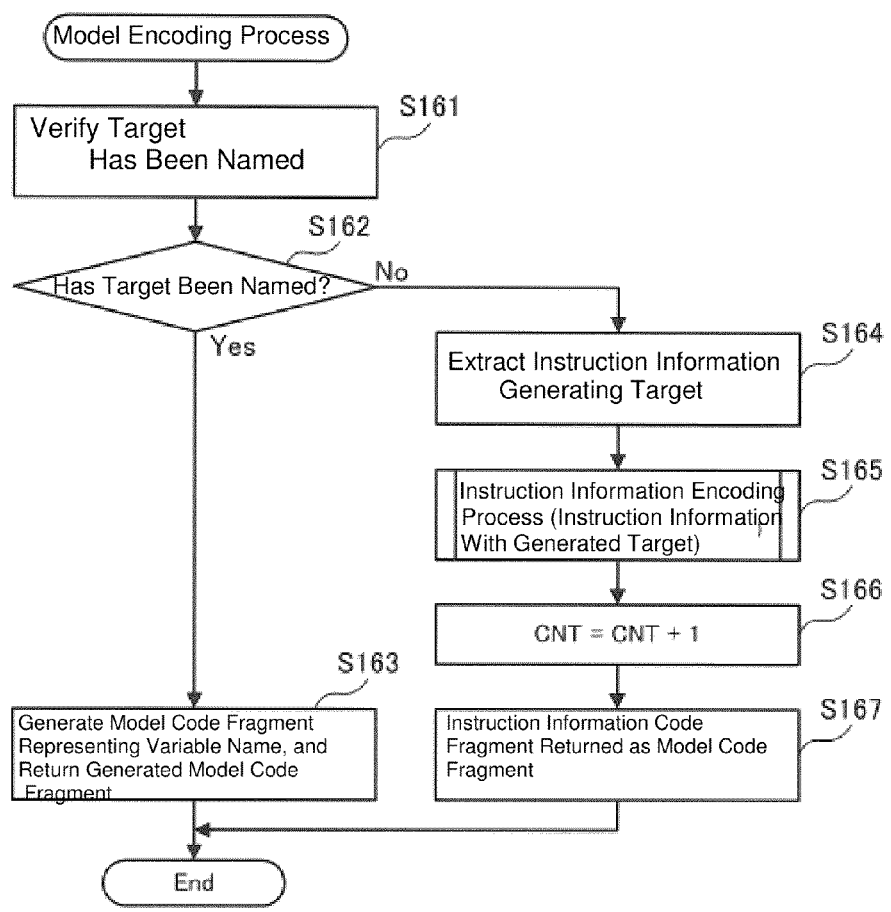
FIG. 13 is a flowchart showing the operational flow of the model encoding process called up during the generation of program code by the program generating device in the embodiment of the present invention.

The following is a detailed explanation of the model encoding process called up in Step 143 and Step 146 of FIG. 12. FIG. 13 is a flowchart showing the flow of the model encoding process. As shown in FIG. 13, the code generating unit 15 references the name-model mapping table 22, confirms whether or not a name has been given to the target passed on during call up (operation target model or argument) (Step 161), and determines whether or not the target has been named (Step 162).

If, as a result, it has been determined that the target has been named, the code generating unit 15 generates a model code fragment representing the variable name assigned to the object, and returns this model code fragment (Step 163). An example of a model code fragment representing a variable name is "fooFrame".

If it has been determined that the object has not been named, the code generating unit 15 first extracts from the instruction information-model mapping table 23 the instruction information which generated the object (Step 164). Next, the code generating unit 15 calls up the instruction information encoding process, and obtains an instruction information code fragment (Step 165). The instruction information encoding process is called up using as a parameter the instruction information for generating a target that was extracted in Step 164. This parameter is enclosed in parentheses in Step 165. The instruction information code fragment returned by the instruction information encoding process represents an instruction or value. In the example shown in FIG. 2, it is the "given character string", etc. Next, the code generating unit 15 adds 1 to the reference counter CNT which indicates unnamed objects that have been encoded (Step 166). Afterwards, the code generating unit 15 returns the instruction information code fragment obtained in Step 165 as the model code fragment (Step 167).

The following is a detailed explanation of the actions performed in Step 123 through Step 132 (including the actions in each of the steps in FIG. 12 and FIG. 13) when the instruction information in each line of the instruction execution sequence table 21 in FIG. 10 has been extracted in Step 122 of FIG. 11.

(1) Extracting Instruction Information (Instance X of the javax.swing.JFrame Class, setTitle Method, Instance a of the java.lang.String Class) Corresponding to Order Information "5"

In FIG. 11, the code generating unit 15 determines in Step 123 that instruction information representing a name for naming an operation target model has not been extracted and determines in Step 128 that instruction information representing an instruction for generating an operation target model has not been extracted because the setTitle method has been extracted, which is another operation instruction that is neither a generation instruction nor a naming instruction. In Step 131, the instruction information encoding process is called up using this instruction information as a parameter.

Then, the code generating unit 15 determines in Step 141 of FIG. 12 that the instruction information does not express a declaration instruction and in Step 142 that the instruction information does not express a constructor instruction. In Step 143, the model encoding process is called up using "instance X of the javax.swing.JFrame class", which is the operation target model in the instruction information. Then, the code generating unit 15 in Step 161 of FIG. 13 references the name-model mapping table 22, and verifies whether or not a name has been given to operation target model "instance X of the javax.swing.JFrame class". In Step 162, it is determined that it has been named "fooFrame". In Step 163, the model code fragment "fooFrame" which expresses a variable name is returned. Here, "fooFrame" is an example of a name assigned to an object.

Returning to FIG. 12, the code generating unit 15 in Step 145 determines whether an argument is present in the instruction information that is the parameter when the instruction information encoding process is called up. In Step 146, the model encoding process is called up using the argument "instance A in the java.lang.String class" in the instruction information as the parameter. Then, the code generating unit 15 in Step 161 of FIG. 13 references the name-model mapping table 22 to verify whether a name has been given to the argument "instance A of the java.lang.String class". In Step 162, it is determined that it has not been named. In Step 164, the instruction information that generated the argument (java.lang.String class, declaration, "given character string") is extracted from the instruction information-model mapping table 23. In Step 165, the instruction information encoding process is called up using this instruction information as the parameter. Then, the code generating unit 15 in Step 141 of FIG. 12 determines that the instruction information is a declaration instruction. In Step 148, the instruction information code fragment "given character string" is returned. Returning to FIG. 13, the code generating unit 15 in Step 166 of FIG. 13 adds 1 to the reference counter CNT for the operation target model "instance A of the java.lang.String class". In Step 167, the instruction information code fragment "given character string" is returned as the model code fragment "given character string". Here, "given character string" is an example of a value for an argument object.

Returning to FIG. 12, the code generating unit 15 in Step 147 returns the instruction information code fragment "fooFrame.setTitle("given character string")". Returning to FIG. 11, the code generating unit 15 in Step 132 adds the code line "fooFrame.setTitle('given character string')" to the initial line of the code buffer.

(2) Extracting Instruction Information (Instance X of the javax.swing.JFrame Class, setTitle Method, Instance B of the java.lang.String Class) Corresponding to Order Information "4"

In FIG. 11, the code generating unit 15 determines in Step 123 that instruction information representing a name for naming an operation target model has not been extracted and determines in Step 128 that instruction information representing an instruction for generating an operation target model has not been extracted because the setTitle method has been extracted, which is another operation instruction that is neither a generation instruction nor a naming instruction. In Step 131, the instruction information encoding process is called up using this instruction information as a parameter.

Then, the code generating unit 15 determines in Step 141 of FIG. 12 that the instruction information does not express a declaration instruction and in Step 142 that the instruction information does not express a constructor instruction. In Step 143, the model encoding process is called up using "instance X of the javax.swing.JFrame class", which is the operation target model in the instruction information. Then, the code generating unit 15 in Step 161 of FIG. 13 references the name-model mapping table 22, and verifies whether or not a name has been given to operation target model "instance X of the javax.swing.JFrame class". In Step 162, it is determined that it has been named "fooFrame". In Step 163, the model code fragment "fooFrame" which expresses a variable name is returned. Here, "fooFrame" is an example of a name assigned to an object.

Returning to FIG. 12, the code generating unit 15 in Step 145 determines whether an argument is present in the instruction information that is the parameter when the instruction information encoding process is called up. In Step 146, the model encoding process is called up using the argument "instance B in the java.lang.String class" in the instruction information as the parameter. Then, the code generating unit 15 in Step 161 of FIG. 13 references the name-model mapping table 22 to verify whether a name has been given to the argument "instance B of the java.lang.String class". In Step 162, it is determined that it has been named "newTitle". In Step 163, model code fragment "newTitle" expressing a variable name is returned. Here, "newTitle" is an example of a name assigned to an argument object.

Returning to FIG. 12, the code generating unit 15 in Step 147 returns the instruction information code fragment "fooFrame.setTitle(newTitle)". Returning to FIG. 11, the code generating unit 15 in Step 132 adds the code line "fooFrame.setTitle(newTitle)" to the initial line of the code buffer.

(3) Extracting Instruction Information (Instance B of the java.lang.String Class, Naming, "newTitle") Corresponding to Order Information "3"

In FIG. 11, the code generating unit 15 in Step 123 determines that an instruction code representing an instruction for naming an operation target model has been extracted. In Step 124, it generates the variable name declaration code fragment "StringnewTitle=". In Step 125, instruction information (java.lang.String class, declaration, "another given character string") which has generated the operation target model "instance B of the java.lang.String class" is extracted from the instruction information-model mapping table 23. In Step 126, the instruction information encoding process is called up using this instruction information as the parameter.

Then, in Step 141 of FIG. 12, the code generating unit 15 determines that this instruction information is a declaration instruction. In Step 148, the instruction information code fragment "another given character string" is returned.

Returning to FIG. 11, the code generating unit 15 generates in Step 127 the code line "StringnewTitle="another given character string"". In Step 132, this code line is added to the initial line of the code buffer.

(4) Extracting Instruction Information (Instance X of the javax.swing.JFrame Class, Naming, "fooFrame") Corresponding to Order Information "2"

In FIG. 11, the code generating unit 15 determines in Step 123 that instruction information representing an instruction for naming an operation target model has been extracted. In Step 124, it generates the variable name declaration fragment "javax.swing.JFramefooFrame=". In Step 125, it extracts from the instruction information-model mapping table 23 the instruction information (javax.swing.JFrame class, constructor, instance A of the java.lang.String class) that generated the operation target model "instance X of the javax.swing.JFrame class". In Step 126, the instruction information encoding process is called up using this instruction information as the parameter.

Then, in FIG. 12, the code generating unit 15 determines in Step 141 that the instruction information is not a declaration instruction. In Step 142, it determines that the instruction information represents a constructor instruction. In Step 144, it generates the constructor code fragment "newjavax.swing-.JFrame("and)". In Step 145, it determines that there is an argument in the instruction information. In Step 146, the model encoding process is called up using the argument "instance A of the java.lang.String class" in the instruction information as the parameter. Then, in Step 161 of FIG. 13, the code generating unit 15 references the name-model mapping table 22, and verifies whether a name has been assigned to the argument "instance A of the java.lang.String class". In Step 162, it determines that it has not been named. In Step 164, it extracts from the instruction information-model mapping table 23 the instruction information (java.lang.String class, declaration, "given character string") that generated the argument. In Step 165, it calls up the instruction information encoding process using this instruction information as the parameter. Then, in Step 141 of FIG. 12, the code generating unit 15 determines that this instruction information represents a declaration instruction. In Step 148, the instruction information code fragment "given character string" is returned. Then, returning to FIG. 13, the code generating unit 15 in Step 166 adds 1 to the reference counter CNT for operation target model "instance A of the java.lang.String class". In Step 167, the instruction information code fragment "given character string" is returned as the model code fragment "given character string". Here, the "given character string" is an example of a value for an argument object.

Then, returning to FIG. 12, the code generating unit 15 in Step 147 returns the instruction information code fragment "newjavax.swing.JFrame("given character string")". Next, returning to FIG. 11, the code generating unit 15 in Step 127 generates the code line "javax.swing.JFramefooFrame=newjavax.swing.JFrame ("given character string")". In Step 132, this code line is added to the initial line of the code buffer.

(5) Extracting Instruction Information (java.lang.String Class, Declaration, "Given Character String") Corresponding to Order Information "1"

In Step 123 of FIG. 11, the code generating unit 15 determines that instruction information representing an instruction for naming an operation target model has not been extracted. In Step 128, it determines that instruction information representing an instruction for generating an operation target model has been extracted. In Step 129, it is determined that operation target model "instance A of the java.lang.String class" has not been named and is referenced by subsequent instruction information. In Step 130, 1 is added to the reference counter CNT for operation target model "instance A of the java.lang.String class".

Next, the program code shown in FIG. 3 is generated by performing the process shown in (1) through (5) above.

A detailed example has been provided of the actions performed by the program generating device when the user operations in FIG. 2 have been performed. The following are the actions performed by the program generating device 10 when the user operations in FIG. 4 have been performed.

First, in addition to the information shown in FIG. 7, the target object managing unit 12 registers the instruction information (instance A of the java.lang.String class, naming, "barTitle") in order information "8" in the instruction execution sequence table 21. Next, in addition to the information shown in FIG. 8, the correspondence information for the name "barTitle" and the object target model "instance A of the java.lang.String class" is registered in the name-model mapping table 22. Thus, the code generating unit 15 deletes from the instruction execution sequence table 21 the instruction information (java.lang.String class, declaration, "given character string") corresponding to order information "1", and moves the instruction information (instance A of the java.lang.String class, naming, "barTitle") corresponding to order information "8" into the position of order information "1".

Next, the process in (1) through (4) above is performed. The difference between the process performed in response to the user operations performed in FIG. 2 and the process performed in response to the user operations performed in FIG. 4 is that, in the case of the former, it is determined that "instance A of the java.lang.String class" has not been named in Step 162 of FIG. 13, and the model code fragment "given character string" is obtained when Steps 164-167 are executed. In the case of the latter, it is determined that "instance A of the java.lang.String class" has been named in Step 162 of FIG. 13, and the model code fragment "barTitle" is obtained when Step 163 is executed. Afterwards, instead of (5) above, processing is performed when the instruction information (instance A of the java.lang.String class, naming, "barTitle") corresponding to order information "1" has been extracted. The program code shown in FIG. 5 is generated by this process.

In the explanation of the present embodiment, an object inside a Java® virtual machine (VM) was the operation target. However, there are no restrictions on objects that can be the target of an operation in the present invention.

In the present embodiment, naming of the target objects was not performed mechanically. Instead, names were received from an external unit. Because variable declarations are generated in the program code only when a target object is named, difficult-to-understand variable declarations are no longer performed. In other words, unnecessary variable declarations are omitted when a target object has not been named. This can generate program code with greater readability. In the present embodiment, target objects that are not used subsequently do not have to be named. In this way, program code closer to naturally written program code can be generated.

Finally, the hardware configuration of a computer of a computer system suitable for realizing the present embodiment will be explained. FIG. 14 is a diagram showing an example of a hardware configuration for this computer. As shown in FIG. 14, the computer has a central processing unit (CPU) 90*a* as the operating means, a main memory 90*c* connected to the CPU 90*a* via a multiboard (M/B) chip set 90*b*, and a display mechanism 90*d* connected to the CPU 90*a* via the same M/B chip set 90*b*. The M/B chip set 90*b* is connected via a bridge circuit 90*e* to a network interface 90*f*, a magnetic disk device (HDD) 90*g*, an audio mechanism 90*h*, a keyboard/mouse 90*i* and a flexible disk drive 90*j*.

In FIG. 14, the various configurational elements are connected via a bus. For example, the CPU 90*a* and the M/B chip set 90*b* are connected to each other, and the M/B chip set 90*b* and the main memory 90*c* are connected to each other via a CPU bus. The M/B chip set 90*b* and the display mechanism 90*d* can be connected to each other via an accelerated graphics port (AGP). However, the M/B chip set 90*b* and the video card are connected to each other via a PCI Express (PCIe) bus if the display mechanism 90*b* includes a video card that is PCI Express compatible. When connected to the bridge circuit 90*e*, the network interface 90*f* can also use PCI Express. The magnetic disk device 90*g* can use a serial ATA (AT attachment), parallel transfer ATA, or Peripheral Components Interconnect (PCI). The keyboard/mouse 90*i* and the flexible disk drive 90*j* can use a Universal Serial Bus (USB).

The present invention can be realized using an all-hardware configuration or an all-software configuration. It can also be realized using both hardware and software. The present invention can be realized as a computer, a data processing system or a computer program product comprising a computer-readable hardware medium or device storing software (i.e., program code) that implements the methods of the present invention when executed by a processor (e.g., CPU 90*a*) of the computer system. The medium or device can be electronic, magnetic, optical, electromagnetic, or a semiconductor system (device or equipment). Examples of computer-readable media or devices include a semiconductor, a solid-state memory device, magnetic tape, a removable computer diskette, random access memory (RAM), read-only memory (ROM), a rigid magnetic disk, or an optical disk. Examples of optical disks used at the current time include compact disk read-only (CD-ROM), compact disk read/write (CD-R/W) and DVD disks.

The computer system comprises the processor 90*a*, the memory 90*c* coupled to the processor, and the computer readable hardware storage device 90*g* coupled to the processor, wherein the storage device contains software (i.e., program code) configured to be executed by the processor via the memory to implement the methods of the present invention.

The present invention has been described above with reference to an embodiment, but the technical scope of the present invention is not limited to this embodiment. It should be apparent to those skilled in the art that various modifications and substitutions are possible that do not depart from the spirit and scope of the present invention.

What is claimed is:

1. A method for processing instruction information through use of a processor of a computer system, said method comprising:

said processor sequentially extracting and processing each instruction information character string of a sequence of instruction information character strings stored in a target object storage unit, wherein each instruction information character string pertains to an associated target object wrapped in the target object storage unit by an associated operation target model, wherein said processing comprises ascertaining independently for each instruction information character string in the sequence whether to generate a code line for said each instruction information character string in the sequence, wherein said ascertaining independently for each instruction information character string comprises determining whether or not a requirement is satisfied and generating the code line and storing the code line in a code buffer if the requirement has been determined to be satisfied and not generating the code line if the requirement has been determined to not be satisfied, wherein the requirement relates to whether the instruction information character string being processed comprises a naming instruction or a generation instruction, wherein the naming instruction is for naming the target object associated with the instruction information character string being processed, wherein the generation instruction is for generating the operation target model associated with the target object associated with the instruction information character string being processed, wherein said ascertaining comprises determining that the requirement is satisfied for one or more instruction information character strings in the sequence, wherein said ascertaining comprises determining that the requirement is not satisfied for at least one instruction information character string in the sequence, after the instruction information character strings in the sequence have been processed, said processor displaying the generated code lines stored in the code buffer.

2. The method of claim 1, wherein said determining that the requirement is satisfied for one or more instruction information character strings comprises determining that a first condition, a second condition, or a third condition is satisfied independently for each information character string of the one or more instruction information character strings, wherein said determining that the requirement is not satisfied for at least one instruction information character string comprises determining that the first condition, the second condition, and the third condition are not satisfied for each information character string of the at least one instruction information character string, wherein the first condition, as applied independently to each information character string, is that said each instruction information character string comprises the naming instruction, wherein the second condition, as applied independently to each information character string, is that said each instruction information character string does not comprises the naming instruction and does not comprise the generation instruction, and wherein the third condition, as applied independently to each information character string, is that said each instruction information character string does not comprises the naming instruction and comprises the generation instruction and that there is no subsequent instruction information character string in the sequence such that the operation target model associated with the subsequent instruction information character string is unnamed.

3. The method of claim 2, wherein said determining that the requirement is satisfied for one or more instruction information character strings comprises determining that the first condition is satisfied for a specific instruction information character string of the one or more instruction information character strings.

4. The method of claim 3, wherein said method comprises after said determining that the first condition is satisfied for a specific instruction information character string of the one or more instruction information character strings:

generating a variable name declaration code fragment;

instruction information content that has generated the operation target model associated with the target object associated with the specific instruction information character string;

determining an instruction information code fraction through use of the instruction information content;

generating the code line for the specific instruction information character string by linking the variable name declaration code fragment to the instruction information code fraction.

5. The method of claim 4, wherein said determining the instruction information code fraction comprises:

determining that the instruction information content represents a declaration instruction for declaring the operation target model associated with the target object associated with the specific instruction information character string; and in response to said determining that the instruction information content represents said declaration instruction, generating the instruction information code fraction representing a class reference.

6. The method of claim 2, wherein said determining that the requirement is satisfied for one or more instruction information character strings comprises determining that the second condition is satisfied for a specific instruction information character string of the one or more instruction information character strings.

7. The method of claim 2, wherein said determining that the requirement is satisfied for one or more instruction information character strings comprises determining that the third condition is satisfied for a specific instruction information character string of the one or more instruction information character strings.

8. A computer program product, comprising a computer readable hardware storage device having computer readable program code stored therein, said program code containing instructions configured to be executed by a processor of a computer system to implement a method for processing instruction information through use of a processor of a computer system, said method comprising:

said processor sequentially extracting and processing each instruction information character string of a sequence of instruction information character strings stored in a target object storage unit, wherein each instruction information character string pertains to an associated target object wrapped in the target object storage unit by an associated operation target model, wherein said processing comprises ascertaining independently for each instruction information character string in the sequence whether to generate a code line for said each instruction information character string in the sequence, wherein said ascertaining independently for each instruction information character string comprises determining whether or not a requirement is satisfied and generating the code line and storing the code line in a code buffer if the requirement has been determined to be satisfied and not generating the code line if the requirement has been determined to not be satisfied, wherein the requirement relates to whether the instruction information character string being processed comprises a naming instruction or a generation instruction, wherein the naming instruction is for naming the target object associated with the instruction information character string being processed, wherein the generation instruction is for generating the operation target model associated with the target object associated with the instruction information character string being processed, wherein said ascertaining comprises determining that the requirement is satisfied for one or more instruction information character strings in the sequence, wherein said ascertaining comprises determining that the requirement is not satisfied for at least one instruction information character string in the sequence, after the instruction information character strings in the sequence have been processed, said processor displaying the generated code lines stored in the code buffer.

9. The computer program product of claim 8,
wherein said determining that the requirement is satisfied for one or more instruction information character strings comprises determining that a first condition, a second condition, or a third condition is satisfied independently for each information character string of the one or more instruction information character strings,
wherein said determining that the requirement is not satisfied for at least one instruction information character string comprises determining that the first condition, the second condition, and the third condition are not satisfied for each information character string of the at least one instruction information character string,
wherein the first condition, as applied independently to each information character string, is that said each instruction information character string comprises the naming instruction,
wherein the second condition, as applied independently to each information character string, is that said each instruction information character string does not comprises the naming instruction and does not comprise the generation instruction, and
wherein the third condition, as applied independently to each information character string, is that said each instruction information character string does not comprises the naming instruction and comprises the generation instruction and that there is no subsequent instruction information character string in the sequence such that the operation target model associated with the subsequent instruction information character string is unnamed.

10. The computer program product of claim 9, wherein said determining that the requirement is satisfied for one or more instruction information character strings comprises determining that the first condition is satisfied for a specific instruction information character string of the one or more instruction information character strings.

11. The computer program product of claim 10, wherein said method comprises after said determining that the first condition is satisfied for a specific instruction information character string of the one or more instruction information character strings:
  generating a variable name declaration code fragment;
  instruction information content that has generated the operation target model associated with the target object associated with the specific instruction information character string;
  determining an instruction information code fraction through use of the instruction information content;
  generating the code line for the specific instruction information character string by linking the variable name declaration code fragment to the instruction information code fraction.

12. The computer program product of claim 11, wherein said determining the instruction information code fraction comprises:
  determining that the instruction information content represents a declaration instruction for declaring the operation target model associated with the target object associated with the specific instruction information character string; and
  in response to said determining that the instruction information content represents said declaration instruction, generating the instruction information code fraction representing a class reference.

13. The computer program product of claim 9, wherein said determining that the requirement is satisfied for one or more instruction information character strings comprises determining that the second condition is satisfied for a specific instruction information character string of the one or more instruction information character strings.

14. The computer program product of claim 9, wherein said determining that the requirement is satisfied for one or more instruction information character strings comprises determining that the third condition is satisfied for a specific instruction information character string of the one or more instruction information character strings.

15. A computer system comprising a processor, a memory coupled to the processor, and a computer readable hardware storage device coupled to the processor, said storage device containing program code configured to be executed by the processor via the memory to implement a method for processing instruction information through use of a processor of a computer system, said method comprising:
  said processor sequentially extracting and processing each instruction information character string of a sequence of instruction information character strings stored in a target object storage unit,
    wherein each instruction information character string pertains to an associated target object wrapped in the target object storage unit by an associated operation target model,
    wherein said processing comprises ascertaining independently for each instruction information character string in the sequence whether to generate a code line for said each instruction information character string in the sequence,
    wherein said ascertaining independently for each instruction information character string comprises determining whether or not a requirement is satisfied and generating the code line and storing the code line in a code buffer if the requirement has been determined to be satisfied and not generating the code line if the requirement has been determined to not be satisfied,
    wherein the requirement relates to whether the instruction information character string being processed comprises a naming instruction or a generation instruction,
    wherein the naming instruction is for naming the target object associated with the instruction information character string being processed,
    wherein the generation instruction is for generating the operation target model associated with the target object associated with the instruction information character string being processed,
    wherein said ascertaining comprises determining that the requirement is satisfied for one or more instruction information character strings in the sequence,
    wherein said ascertaining comprises determining that the requirement is not satisfied for at least one instruction information character string in the sequence,
  after the instruction information character strings in the sequence have been processed, said processor displaying the generated code lines stored in the code buffer.

16. The computer system of claim 15,
wherein said determining that the requirement is satisfied for one or more instruction information character strings comprises determining that a first condition, a second condition, or a third condition is satisfied independently for each information character string of the one or more instruction information character strings,
wherein said determining that the requirement is not satisfied for at least one instruction information character string comprises determining that the first condition, the second condition, and the third condition are not satisfied for each information character string of the at least one instruction information character string,
wherein the first condition, as applied independently to each information character string, is that said each instruction information character string comprises the naming instruction,
wherein the second condition, as applied independently to each information character string, is that said each instruction information character string does not comprises the naming instruction and does not comprise the generation instruction, and
wherein the third condition, as applied independently to each information character string, is that said each instruction information character string does not comprises the naming instruction and comprises the generation instruction and that there is no subsequent instruction information character string in the sequence such that the operation target model associated with the subsequent instruction information character string is unnamed.

17. The computer system of claim 16, wherein said determining that the requirement is satisfied for one or more instruction information character strings comprises determining that the first condition is satisfied for a specific instruction information character string of the one or more instruction information character strings.

18. The computer system of claim 17, wherein said method comprises after said determining that the first condition is satisfied for a specific instruction information character string of the one or more instruction information character strings:
- generating a variable name declaration code fragment; instruction information content that has generated the operation target model associated with the target object associated with the specific instruction information character string;
- determining an instruction information code fraction through use of the instruction information content;
- generating the code line for the specific instruction information character string by linking the variable name declaration code fragment to the instruction information code fraction.

19. The computer system of claim 16, wherein said determining that the requirement is satisfied for one or more instruction information character strings comprises determining that the second condition is satisfied for a specific instruction information character string of the one or more instruction information character strings.

20. The computer system of claim 16, wherein said determining that the requirement is satisfied for one or more instruction information character strings comprises determining that the third condition is satisfied for a specific instruction information character string of the one or more instruction information character strings.

* * * * *